H. G. Porter,
Hay Fork.
No. 105,722.
Patented July 26, 1870.
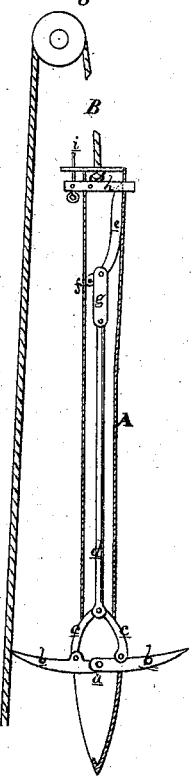
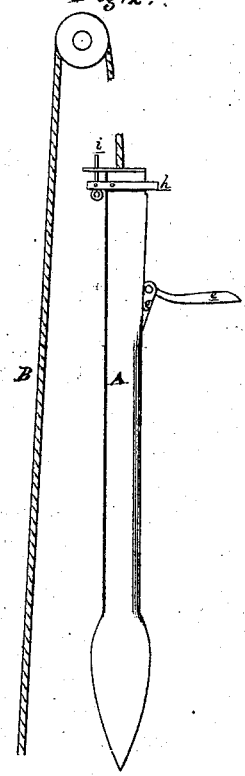
Attest
H. F. Eberts.
H. S. Sprague
Inventor.
H. G. Porter.
Per Attorney
Thos. S. Sprague

United States Patent Office.

HENRY G. PORTER, OF GRAND RAPIDS, MICHIGAN.

Letters Patent No. 105,722, dated July 26, 1870.

IMPROVEMENT IN HORSE HAY-FORKS.

The Schedule referred to in these Letters Patent and making part of the same.

*To whom it may concern:*

Be it known that I, HENRY G. PORTER, of Grand Rapids, in the county of Kent and State of Michigan, have invented a new and useful Improvement in Hay-Elevators; and I do declare that the following is a true and accurate description thereof, reference being had to the accompanying drawing, and to the letters of reference marked thereon, and being a part of this specification, in which—

Figure 1 is a sectional elevation of my improved fork and snatch-pulley, as when hoisting;

Figures 2 and 3 show their position after dumping; and

Figure 3 is a side elevation of the pulley.

Like letters indicate like parts in each figure.

The nature of this invention relates to an improved method of elevating hay, and consists in a new and peculiar harpoon-fork, the tines of which issue near the extremity thereof, enabling the operator to take a load from the floor of the rack; in the peculiar mechanism for projecting the tines and for keeping them in that position until the fork is elevated to the top of the barn, when a tripper, projecting above its top, strikes the carrier, disengages the tines, and dumps the load.

In the drawing—

A represents my improved fork, the shank of which is a metallic tube, slightly flattened, and suspended from the hoist-rope B.

At $a$, in the harpoon-point, are pivoted the tines $b$, to which are pivoted the links $c$, connecting them with the rod $d$, running up through the shank of the fork, which is open at one side in its upper part.

$e$ is a lever, pivoted at $f$, in the upper part of the shank.

To this lever is connected the rod $d$ by the link $g$.

$h$ is a latch, embracing the head of the fork, to which it is pivoted.

The head of the fork is covered by a flat plate, through which projects upward a trip-rod, $i$, pivoted in the rear end of the latch.

The hoist-rope is led up over a pulley in a carrier, or over fixed pulley in the roof of the barn; but, preferaby, I employ for this purpose the carrier patented by me June 29, 1869, thence down to a pulley at the door-sill of the barn, and to its end is attached a horse.

The operation of this improvement is as follows:

The loader, taking the fork in hand, throws the tines into the point by pressing down the lever $e$; in this position he inserts it into the hay, and throws out the tines by raising the lever $e$ into the head of the fork, in which position it is secured by dropping the latch $h$ into place.

When the loaded fork has reached the carrier, its trip-rod $i$ striking it, raises the latch, which leaves the tines free to drop into the point, and the load is dumped.

Where a fixed pulley is used in the roof of the barn, a tripping line may be attached to the latch and operated in the usual manner, the latch being provided with a ring for that purpose.

What I claim as my invention, and desire to secure by Letters Patent, is—

The harpoon-fork A, provided with tines $b$, links $c$, rod $d$, lever $e$, link $g$, latch $h$, and trip $i$, when each of said parts is constructed as described and all are arranged to operate as and for the purposes set forth.

HENRY G. PORTER.

Witnesses:
J. W. RANSOM,
E. P. FITCH.